(12) United States Patent
Minh et al.

(10) Patent No.: US 8,441,269 B2
(45) Date of Patent: May 14, 2013

(54) DETERMINING FORMATION PROPERTIES WHILE DRILLING

(75) Inventors: Chanh Cao Minh, Katy, TX (US); Ahmad Madjidi, Vancouver (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 432 days.

(21) Appl. No.: 12/721,845

(22) Filed: Mar. 11, 2010

(65) Prior Publication Data
US 2010/0283490 A1    Nov. 11, 2010

Related U.S. Application Data

(60) Provisional application No. 61/161,565, filed on Mar. 19, 2009.

(51) Int. Cl.
*G01R 27/08* (2006.01)
*G01V 3/00* (2006.01)

(52) U.S. Cl.
USPC ........... 324/696; 324/303; 324/324; 324/333; 324/338; 324/356; 324/369; 324/694; 702/6; 702/7; 702/9; 702/11

(58) Field of Classification Search ............. 324/303, 324/323–375, 694, 696; 702/6–13
See application file for complete search history.

(56) References Cited

U.S. PATENT DOCUMENTS

| | | | | |
|---|---|---|---|---|
| 4,899,112 A | * | 2/1990 | Clark et al. | 324/338 |
| 6,844,729 B2 | * | 1/2005 | Herron et al. | 324/303 |
| 7,532,984 B2 | * | 5/2009 | Syngaevsky | 702/13 |
| 7,623,968 B2 | | 11/2009 | Griffiths | |
| 7,983,845 B2 | * | 7/2011 | Minh | 702/7 |
| 2012/0043966 A1 | * | 2/2012 | Montaron | 324/324 |

FOREIGN PATENT DOCUMENTS
EP    1795921 A1    6/2007

* cited by examiner

*Primary Examiner* — Patrick Assouad
*Assistant Examiner* — Christopher McAndrew
(74) *Attorney, Agent, or Firm* — Darla P. Fonseca

(57) ABSTRACT

The present disclosure relates to a method to determine a characteristic of a subsurface formation using a downhole logging tool. A downhole logging tool having the ability to make substantially concurrent disparate measurements on the subsurface formation is provided and substantially concurrent disparate measurements on the formation using the downhole logging tool are made. Those measurements are used to solve a system of equations simultaneously and the solution to the system of equations is used to determine the characteristic of the subsurface formation.

16 Claims, 15 Drawing Sheets

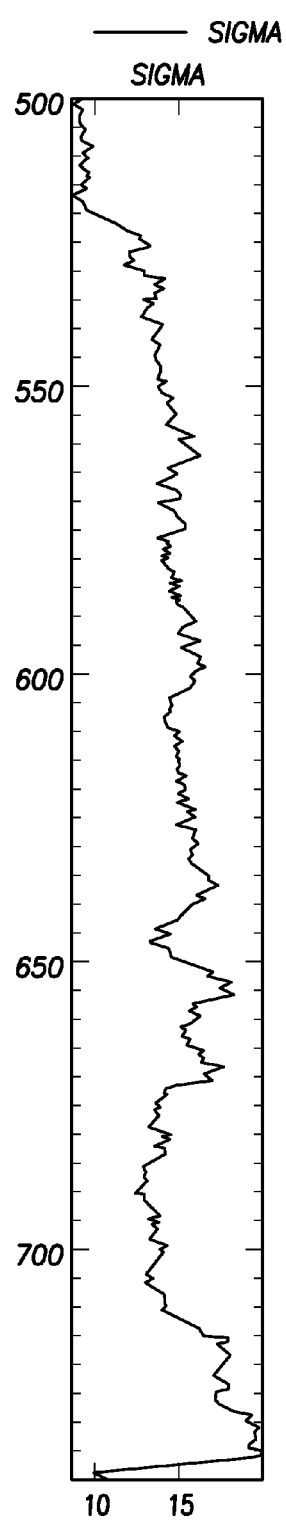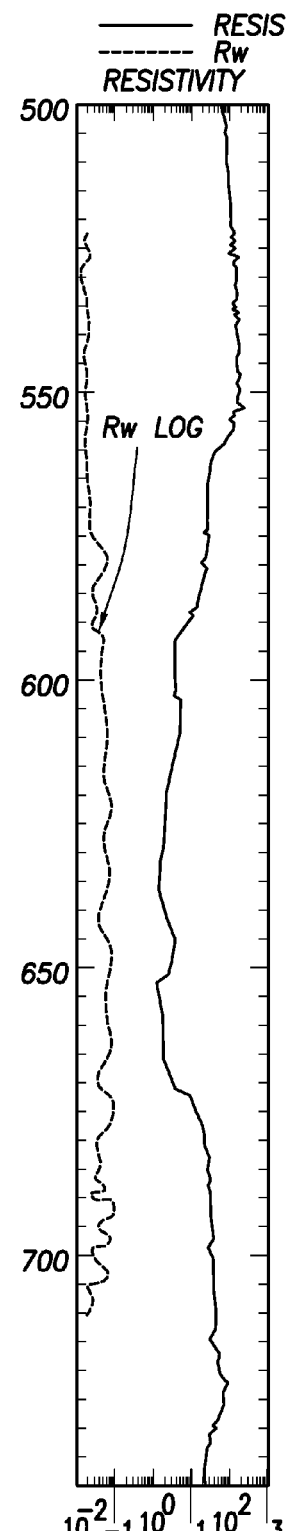
FIG.5C
FIG.5D

DETERMINING FORMATION PROPERTIES WHILE DRILLING

CROSS-REFERENCE TO OTHER APPLICATIONS

This application claims, under 35 U.S.C. 119(e), priority to and the benefit of U.S. Provisional Application No. 61/161,565, filed Mar. 19, 2009.

BACKGROUND

1. Technical Field

The present application relates generally to the logging of subsurface formations surrounding a wellbore using a downhole logging tool, and particularly to making disparate measurements with the tool while drilling and using those disparate measurements to infer one or more formation properties.

2. Background Art

Logging tools have long been used in wellbores to make, for example, formation evaluation measurements to infer properties of the formations surrounding the borehole and the fluids in the formations. Common logging tools include electromagnetic tools, nuclear tools, and nuclear magnetic resonance (NMR) tools, though various other tool types are also used.

Early logging tools were run into a wellbore on a wireline cable, after the wellbore had been drilled. Modern versions of such wireline tools are still used extensively. However, the need for information while drilling the borehole gave rise to measurement-while-drilling (MWD) tools and logging-while-drilling (LWD) tools. MWD tools typically provide drilling parameter information such as weight on the bit, torque, temperature, pressure, direction, and inclination. LWD tools typically provide formation evaluation measurements such as resistivity, porosity, and NMR distributions (e.g., T1 and T2). MWD and LWD tools often have components common to wireline tools (e.g., transmitting and receiving antennas), but MWD and LWD tools must be constructed to not only endure but to operate in the harsh environment of drilling.

The Schlumberger EcoScope™ tool is capable of measuring formation total porosity ($\Phi$), capture cross section ($\Sigma$), and resistivity (R) simultaneously. The collocation of sensors on the tool allows the measurements to be taken substantially in the same formation zone of investigation and substantially at the same time.

SUMMARY

The present disclosure relates to a method to determine a characteristic of a subsurface formation using a downhole logging tool. A downhole logging tool having the ability to make substantially concurrent disparate measurements on the subsurface formation is provided and substantially concurrent disparate measurements on the formation using the downhole logging tool are made. Those measurements are used to solve a system of equations simultaneously and the solution to the system of equations is used to determine the characteristic of the subsurface formation.

Other aspects and advantages will become apparent from the following description and the attached claims.

BRIEF DESCRIPTION OF THE FIGURES

FIGS. 5A-5G are output logs of gamma ray (5A), porosity (5B), water capture cross section (5C), water resistivity (5D), water saturation from water resistivity (5E), water saturation from water capture cross section (5F), and salinity (5G), in accordance with one embodiment in the present disclosure.

It is to be understood that the drawings are to be used to understand various embodiments and/or features. The figures are not intended to unduly limit any present or future claims related to this application.

DETAILED DESCRIPTION

Some embodiments will now be described with reference to the figures. Like elements in the various figures will be referenced with like numbers for consistency. In the following description, numerous details are set forth to provide an understanding of various embodiments and/or features. However, it will be understood by those skilled in the art that some embodiments may be practiced without many of these details and that numerous variations or modifications from the described embodiments are possible. As used here, the terms "above" and "below", "up" and "down", "upper" and "lower", "upwardly" and "downwardly", and other like terms indicating relative positions above or below a given point or element are used in this description to more clearly describe certain embodiments. However, when applied to equipment and methods for use in wells that are deviated or horizontal, such terms may refer to a left to right, right to left, or diagonal relationship as appropriate.

Figure 1:
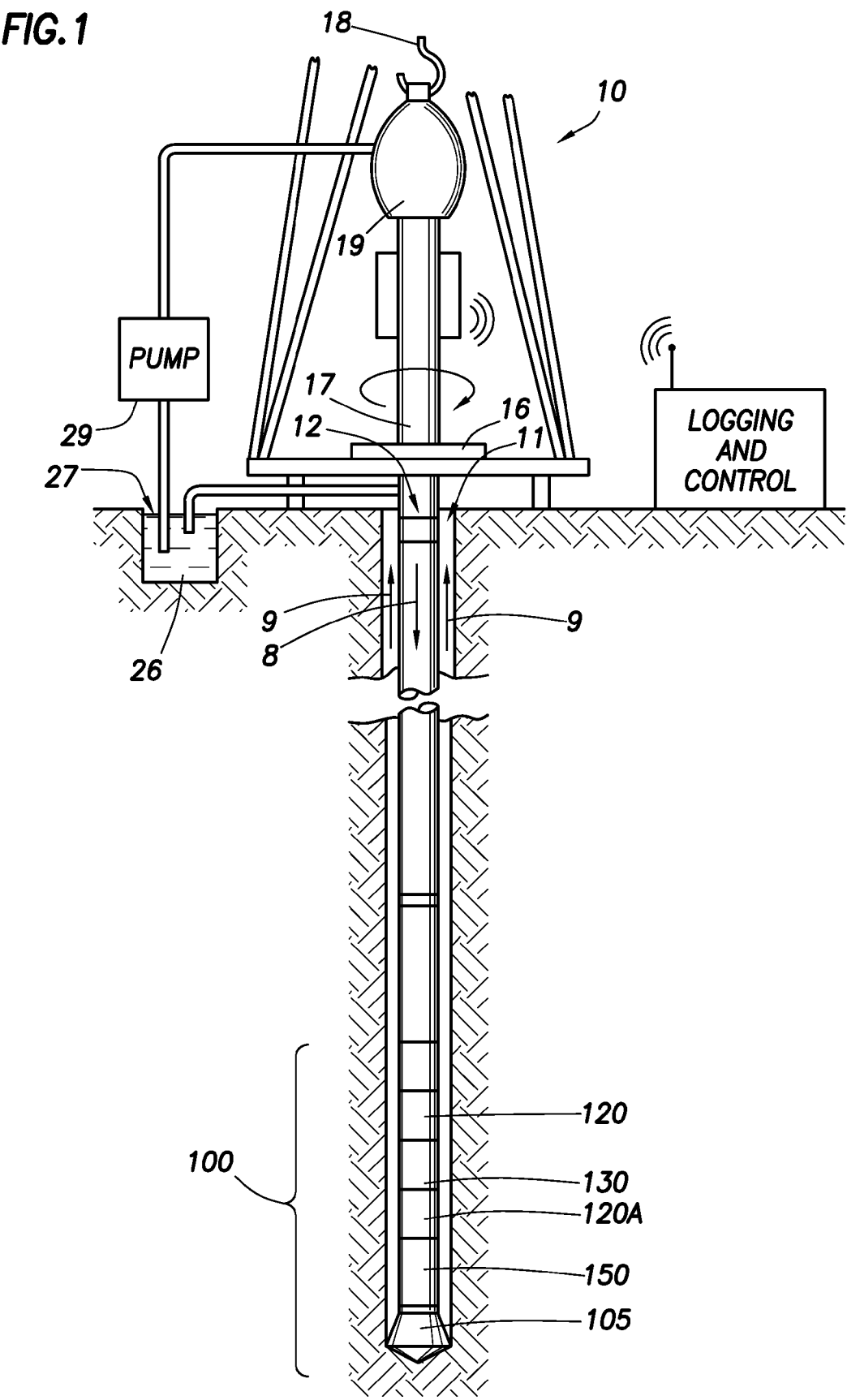
FIG. 1 illustrates an exemplary well site system.

FIG. 1 illustrates a well site system in which various embodiments can be employed. The well site can be onshore or offshore. In this exemplary system, a borehole 11 is formed in subsurface formations by rotary drilling in a manner that is well known. Some embodiments can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. As is well known, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment includes a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes a resistivity measuring device.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick/slip measuring device, a direction measuring device, and an inclination measuring device.

Figures 2, 4:
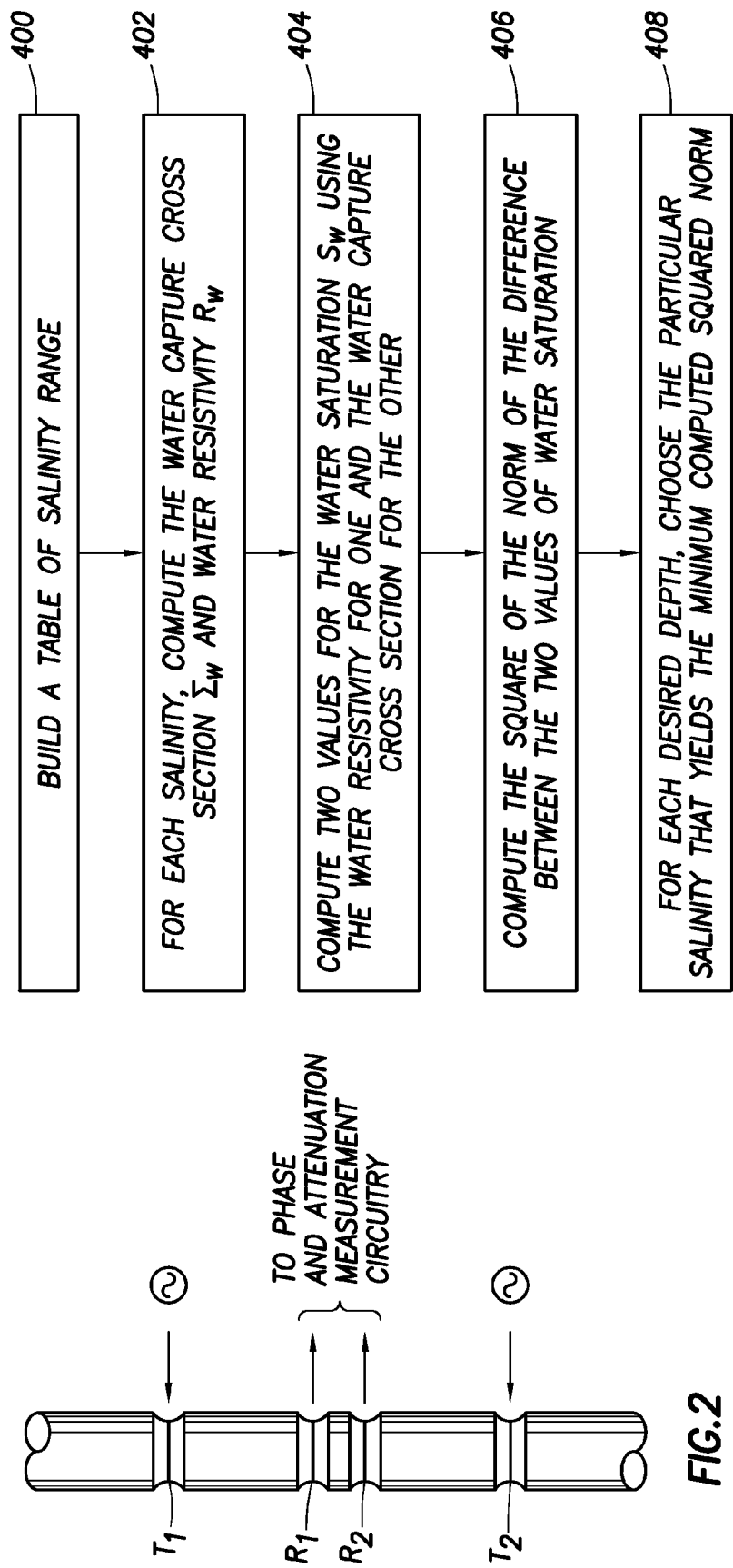
FIG. 2 shows a prior art electromagnetic logging tool.
FIG. 4 is a flowchart showing an exemplary embodiment to numerically determine the salinity of a formation fluid, in accordance with one embodiment in the present disclosure.

An example of a tool which can be the LWD tool 120, or can be a part of an LWD tool suite 120A of the system and method hereof, is the dual resistivity LWD tool disclosed in U.S. Pat. No. 4,899,112 and entitled "Well Logging Apparatus And Method For Determining formation Resistivity At A Shallow And A Deep Depth," incorporated herein by reference. As seen in FIG. 2, upper and lower transmitting antennas, $T_1$ and $T_2$, have upper and lower receiving antennas, $R_1$ and $R_2$, therebetween. The antennas are formed in recesses in a modified drill collar and mounted in insulating material. The phase shift of electromagnetic energy as between the receivers provides an indication of formation resistivity at a relatively shallow depth of investigation, and the attenuation of electromagnetic energy as between the receivers provides an indication of formation resistivity at a relatively deep depth of investigation. The above-referenced U.S. Pat. No. 4,899,112 can be referred to for further details. In operation, attenuation-representative signals and phase-representative signals are coupled to a processor, an output of which is coupleable to a telemetry circuit.

Recent electromagnetic logging tools use one or more tilted or transverse antennas, with or without axial antennas. Those antennas may be transmitters or receivers. A tilted antenna is one whose dipole moment is neither parallel nor perpendicular to the longitudinal axis of the tool. A transverse antenna is one whose dipole moment is perpendicular to the longitudinal axis of the tool, and an axial antenna is one whose dipole moment is parallel to the longitudinal axis of the tool. Two antennas are said to have equal angles if their dipole moment vectors intersect the tool's longitudinal axis at the same angle. For example, two tilted antennas have the same tilt angle if their dipole moment vectors, having their tails conceptually fixed to a point on the tool's longitudinal axis, lie on the surface of a right circular cone centered on the tool's longitudinal axis and having its vertex at that reference point. Transverse antennas obviously have equal angles of 90 degrees, and that is true regardless of their azimuthal orientations relative to the tool.

As stated above, at least one modern while-drilling logging tool is capable of making simultaneous, disparate measurements in one or more zones of interest in a subsurface formation. For example, such disparate measurements may include the formation total porosity ($\Phi$), the capture cross section ($\Sigma$ or Sigma), and the resistivity (R). The collocation of sensors on the tool allows the measurements to be taken substantially in the same formation zone of investigation and substantially at the same time. A downhole assembly of tools, as opposed to a single, integrated tool, may also be used if it is capable of making substantially simultaneous, disparate measurements in one or more zones of interest in a subsurface formation. The single, integrated tool or the assembly of tools may be disposed on a wireline, a drill string, or some other conveyance mechanism.

Using those measurements, one may solve certain equations (e.g., Sigma and Resistivity) simultaneously to obtain, for example, estimates of water salinity and saturation that are mutually consistent with the measurements. In another embodiment, one may generate and display the solution graphically. For the example given, if invasion is negligible, the results are representative of the virgin zone.

Water saturation ($S_w$) interpretations from stand-alone Sigma and resistivity computations rely on, among other presumably known inputs, a water salinity input to derive Sigma water ($\Sigma_w$), and a water resistivity ($R_w$) input. The Sigma equation can be written as:

$$\Sigma=\Sigma_m(1-\Phi_t)+\Phi S_w \Sigma_w+\Phi_t(1-S_w)\Sigma_{hc} \qquad (1)$$

where $\Sigma_m$, $\Sigma_w$ and $\Sigma_{hc}$, are Sigma of the matrix, formation water, and hydrocarbon, respectively. The resistivity equation is given by Archie's equation:

$$S_w^n = R_w/(\Phi^m R) \qquad (2)$$

where m and n are the cementation and saturation exponents, respectively.

In this example, we use a clean (non-shaly) formation for illustration purposes only. Extension to shaly formations is trivial using shaly sands techniques. Both $\Sigma_w$ and $R_w$ are functions of the salinity ppm and temperature t, and $\Sigma_w$ is also a function of pressure p. These may be functionally represented as:

$$\Sigma_w f(ppm, t, p)$$

$$R_w = g(ppm, t) \qquad (3)$$

Figure 3A:
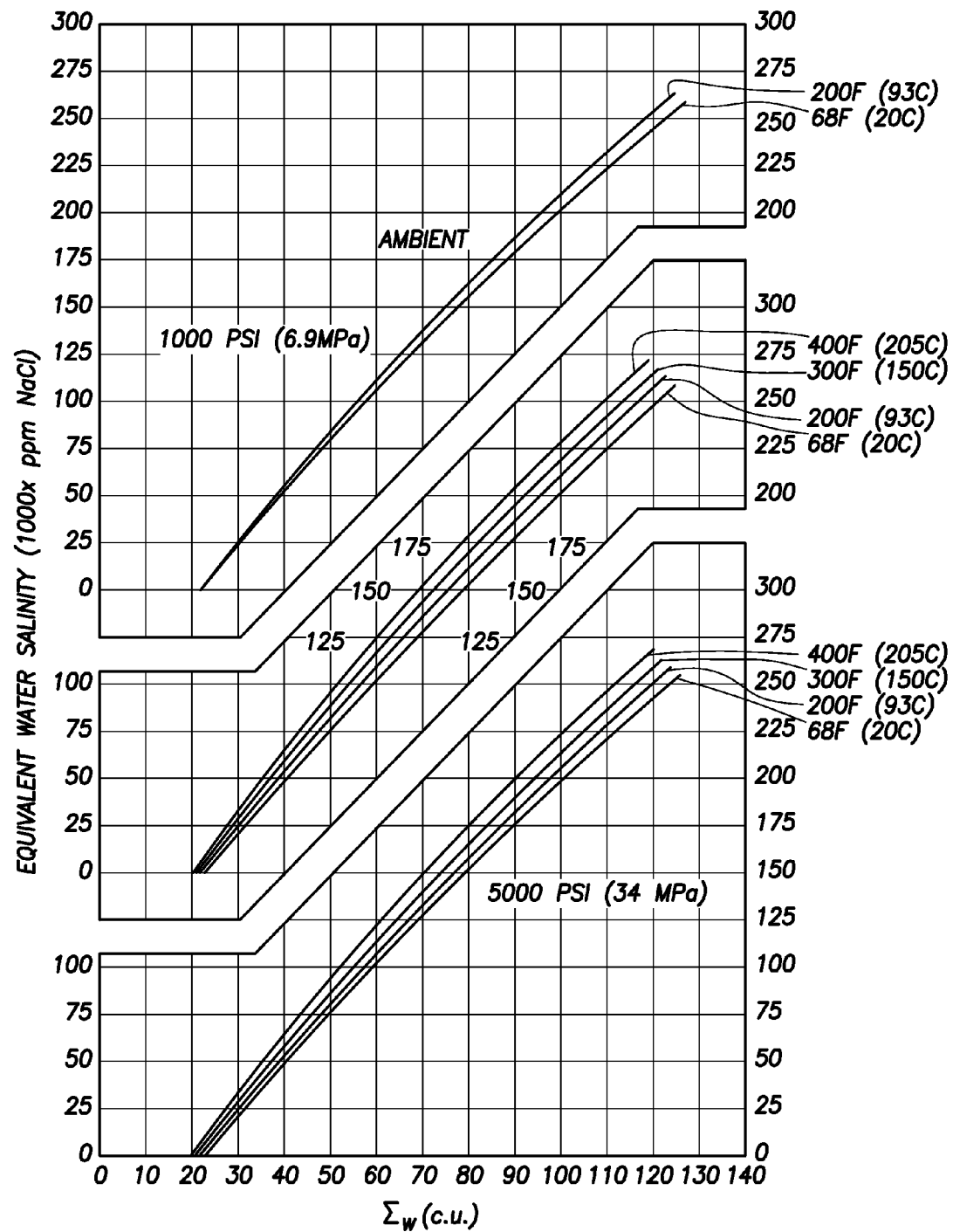
FIGS. 3A and 3B show example plots of the water capture cross section (3A) and resistivity (3B) as functions of salinity, pressure, and temperature, in accordance with one embodiment in the present disclosure.
Figure 3B:
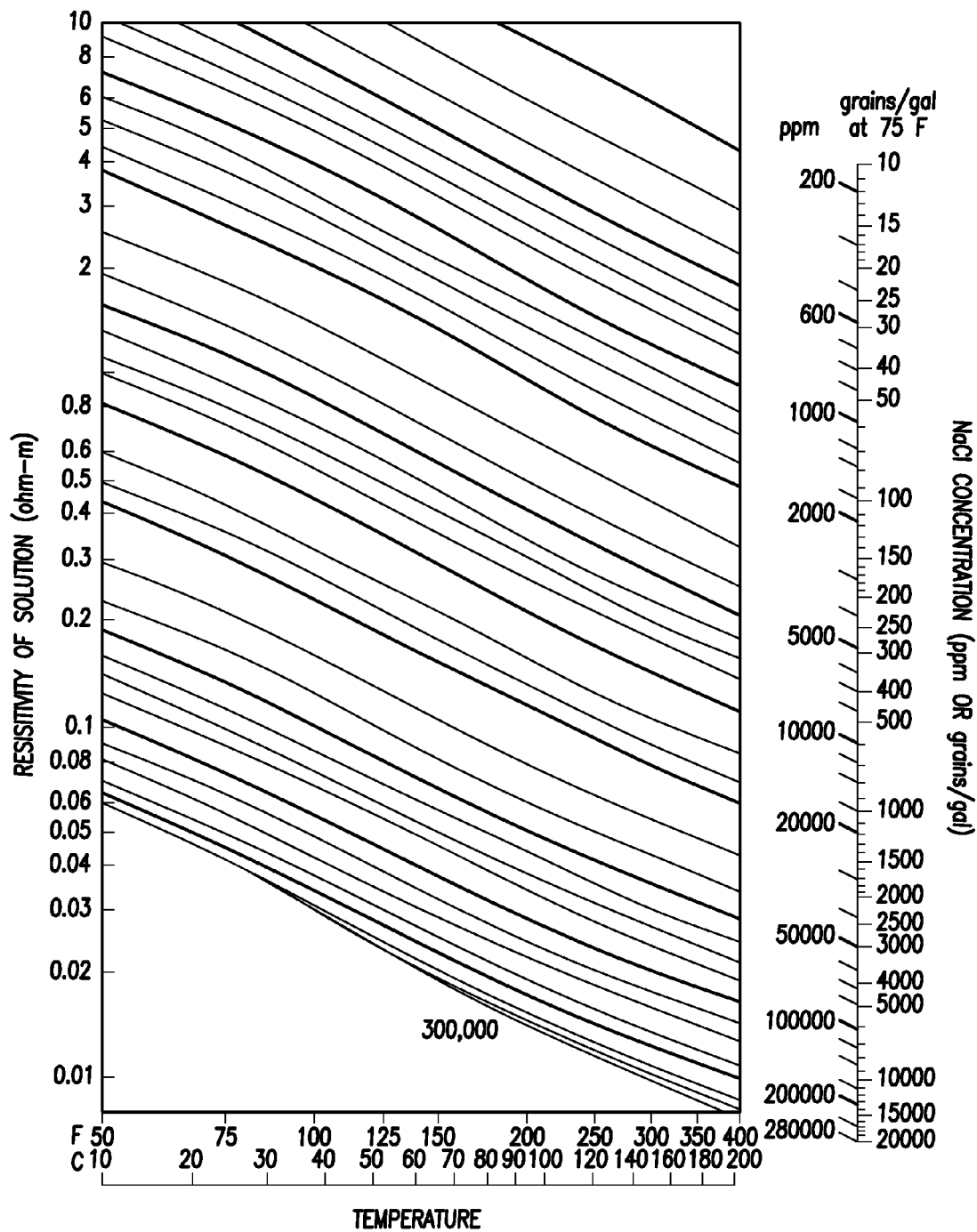
Figure 5A:
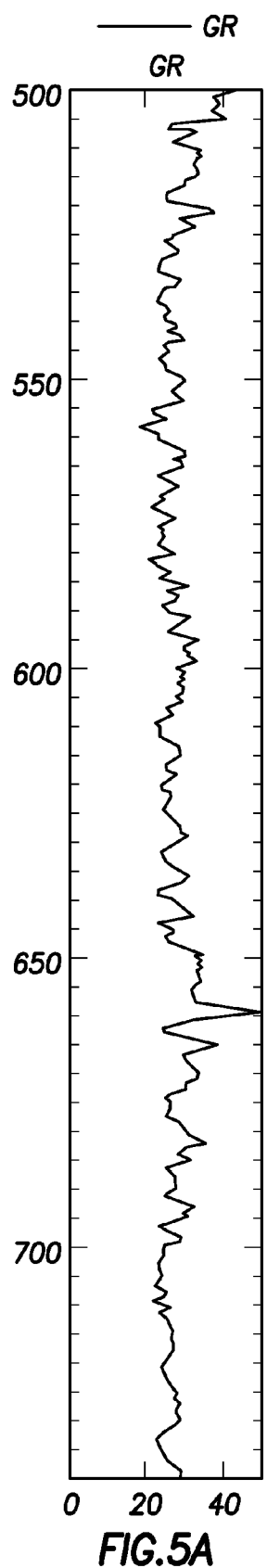
Figure 5B:
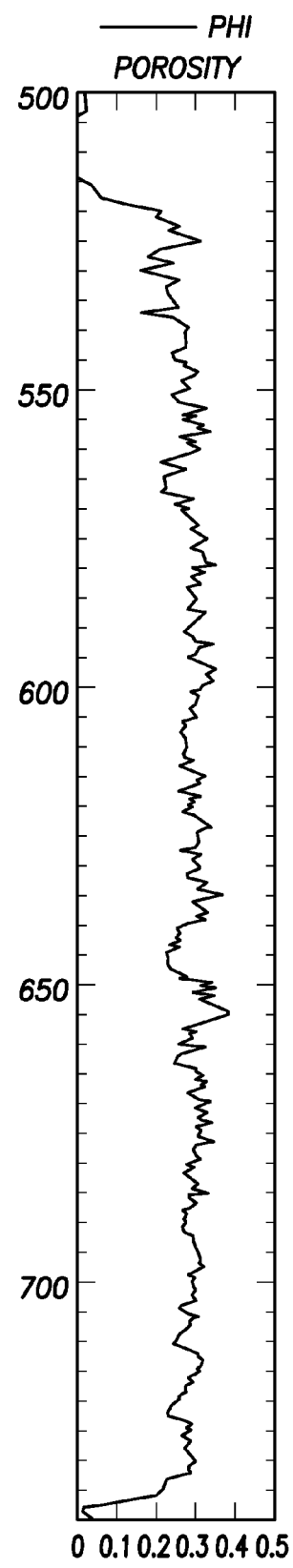
Figure 5E:
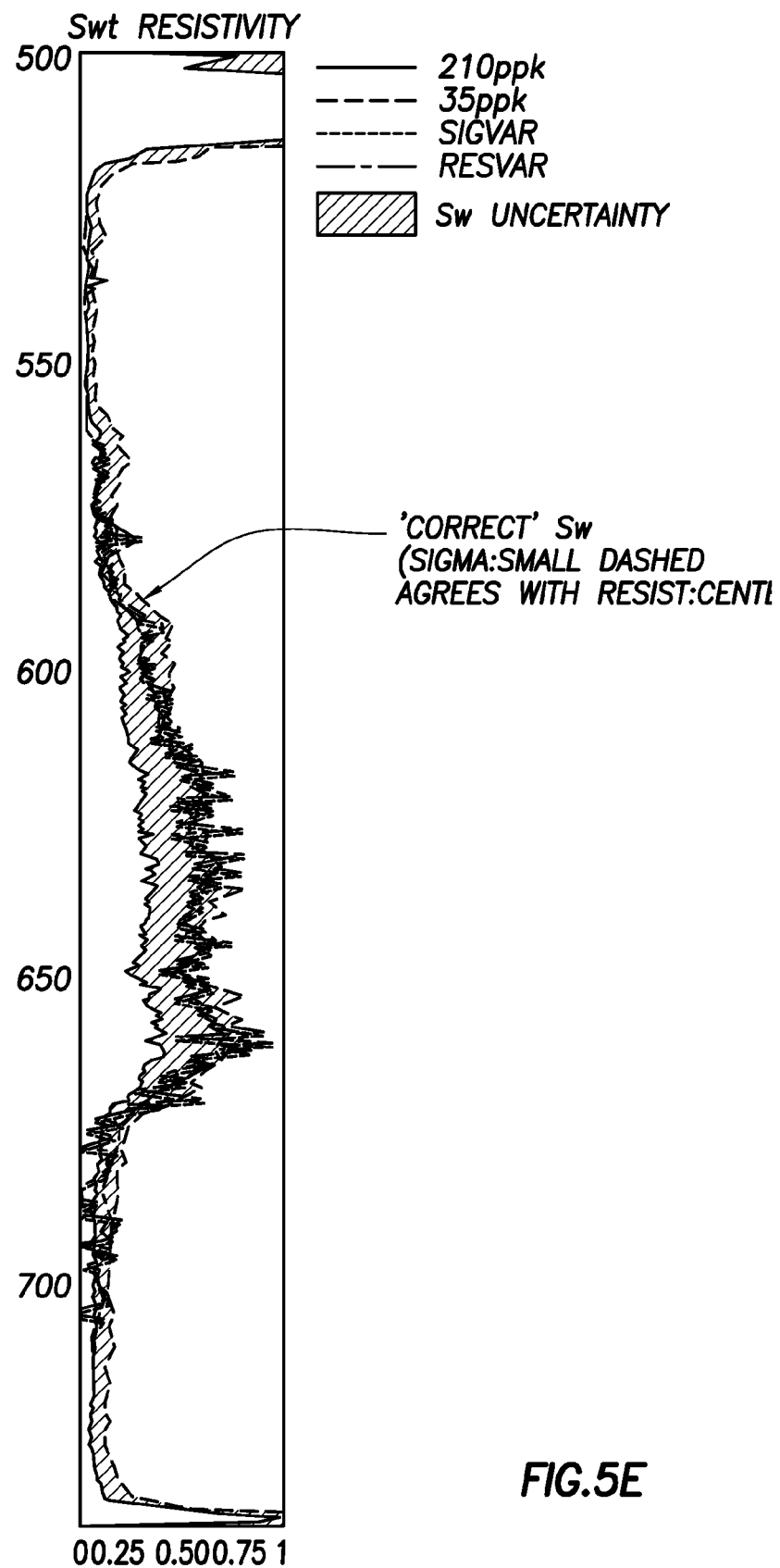
Figure 5F:
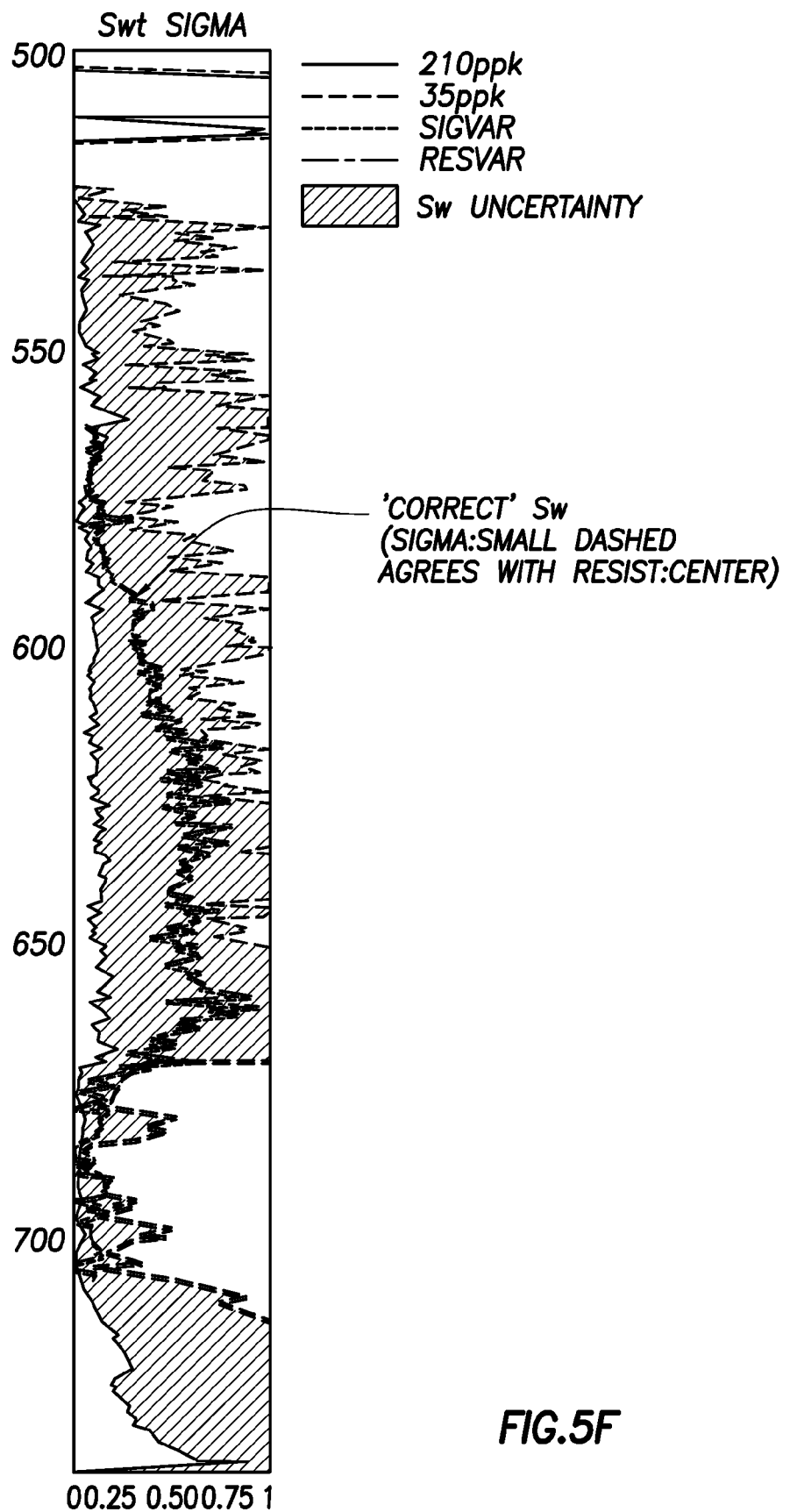
Figure 5G:
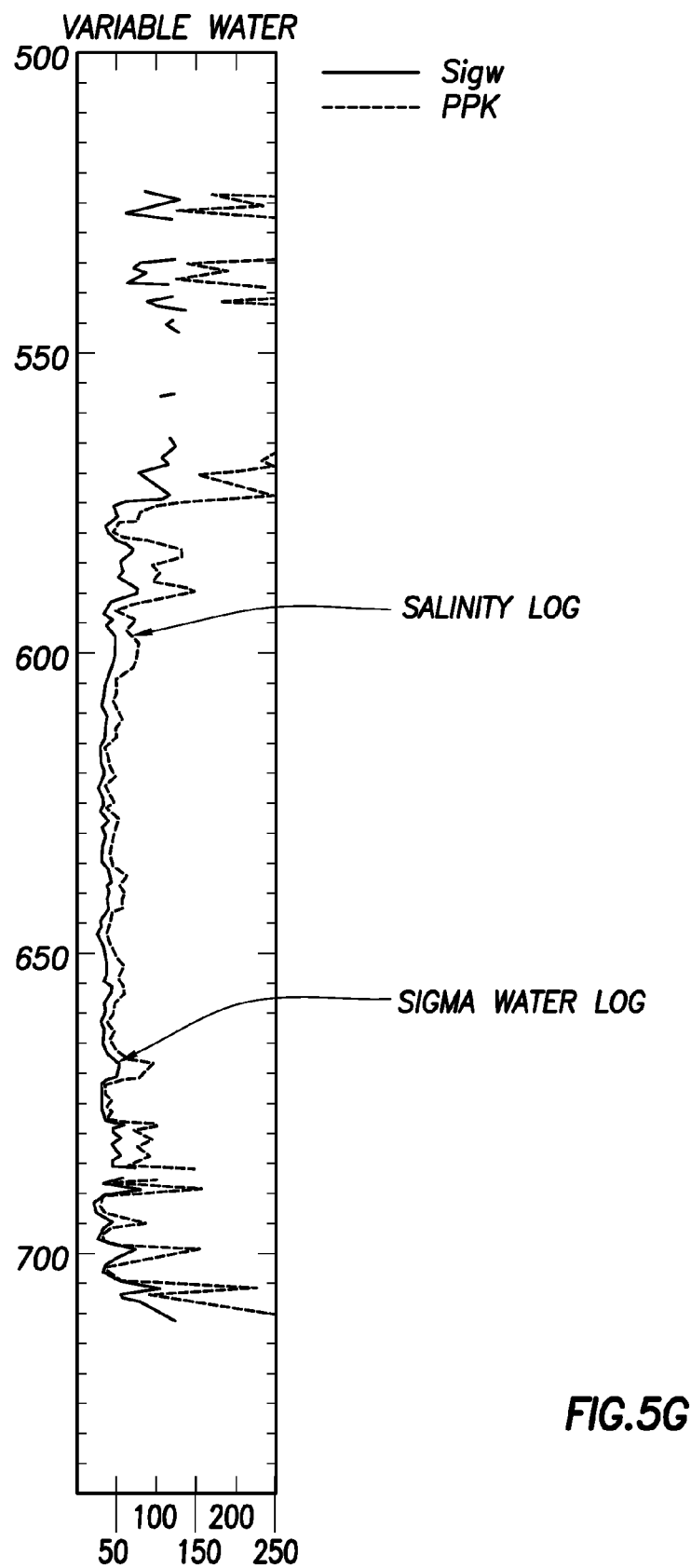

Specific examples of particular functional relationships are shown graphically in FIGS. 3A and 3B, respectively. Assuming that both the resistivity and the Sigma logs read the same formation at the same time, a numerical technique to simultaneously solve equations 1, 2, and 3 is described below and illustrated in FIG. 4.

In one embodiment, a first step is to build a table of salinity range (step 400). For each salinity, the water capture cross section $\Sigma_w$ and water resistivity $R_w$ are computed using equation 3 (step 402). The water saturation is computed from the water resistivity using equation 2 and from the water capture cross section using equation 1 (step 404). The square of the norm of the difference between the water saturation computed from the water resistivity and the water saturation computed from the water capture cross section is computed (step 406), and the solution is deemed the particular salinity that yields the minimum computed squared norm (step 408).

Using that process, equations 1, 2, and 3 can be simultaneously solved numerically. The input parameters are porosity, the matrix capture cross section, the hydrocarbon capture cross section, and an Archie saturation model with its relevant parameters (but no water parameter is needed). FIGS. 5A-5G show exemplary output logs for gamma ray (5A), porosity (5B), water capture cross section (5C), water resistivity (5D), water saturation from water resistivity (5E), water saturation from water capture cross section (5F), and salinity (5G).

Figure 6:
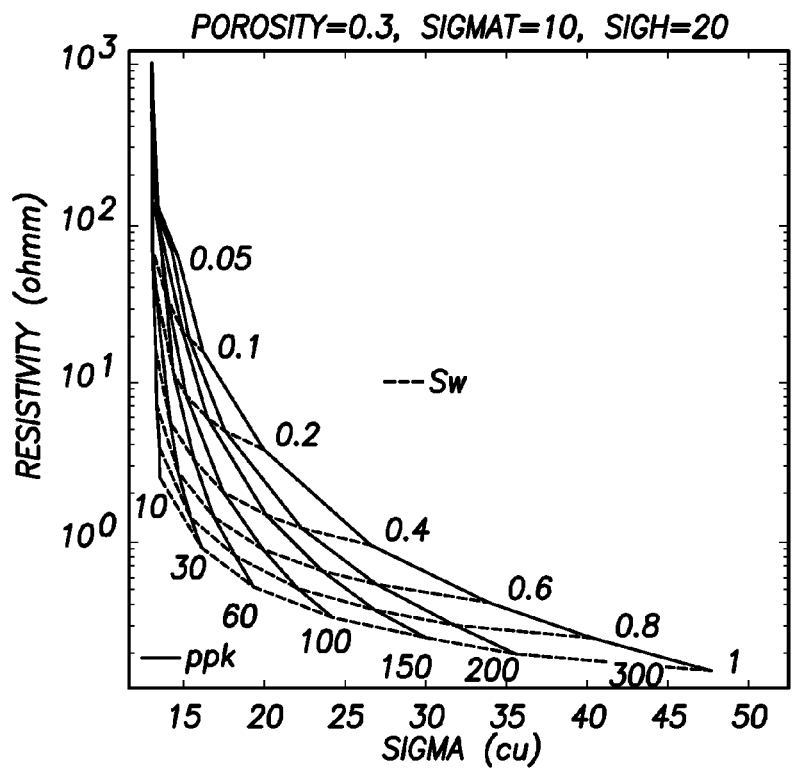
FIG. 6 is a crossplot of water capture cross section and resistivity, in accordance with one embodiment in the present disclosure.
Figure 7:
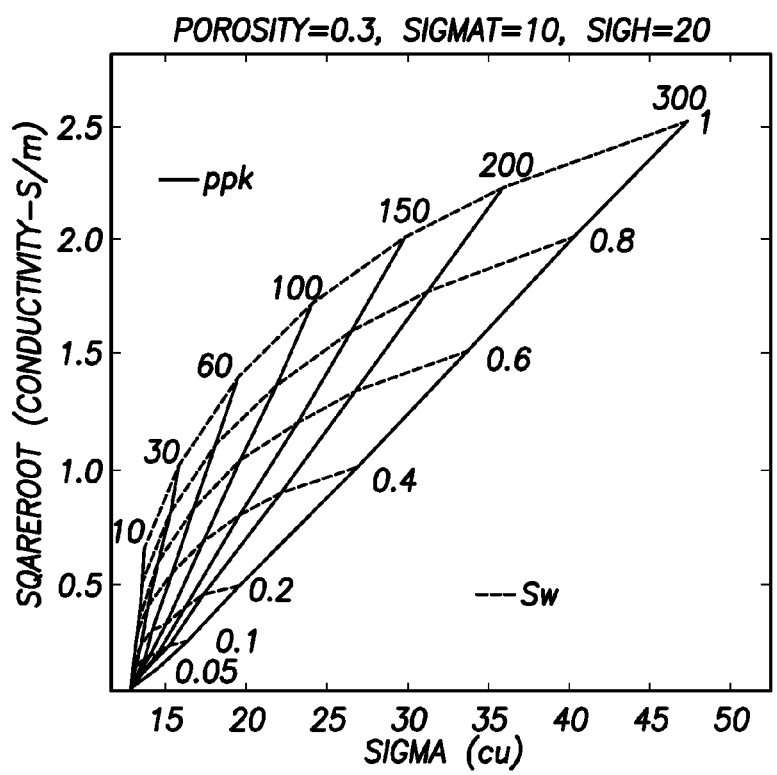
FIG. 7 is a crossplot of water capture cross section and the square root of the conductivity, in accordance with one embodiment in the present disclosure.

One possible graphical output or solution is a dynamic crossplot of Sigma versus Resistivity (FIG. 6), whereby the crossplot overlays changes with porosity, matrix, and fluids properties. The overlay is a grid of equi-salinity and equi-saturation lines. Other measurements such as density-neutron and spectroscopy can be used to estimate the porosity and matrix endpoints. One aspect of the dynamic Sigma-Resistivity crossplot is that it contains both the forward and inverse solutions. That is, having the forward solution means that from salinity, saturation, porosity, and other formation parameters, synthetic Sigma and Resistivity logs can be produced. Having the inverse solution means that from measured Sigma and Resistivity logs and other formation parameters, water salinity and saturation are given by the crossplot overlay. Since the square root of conductivity, sqrC, (=sqr(1/R)) is proportional to the water volume, one may crossplot the equivalent Sigma versus sqrC to gain more dynamic range, as shown in FIG. 7.

A further aspect of the crossplots is that they contain the domain of data and answers from the petrophysics viewpoint. Those could be used for quality control purposes. For example, the input data could be validated. The crossplots contain or allow for more petrophysical insight than a set of equations.

Figure 8:
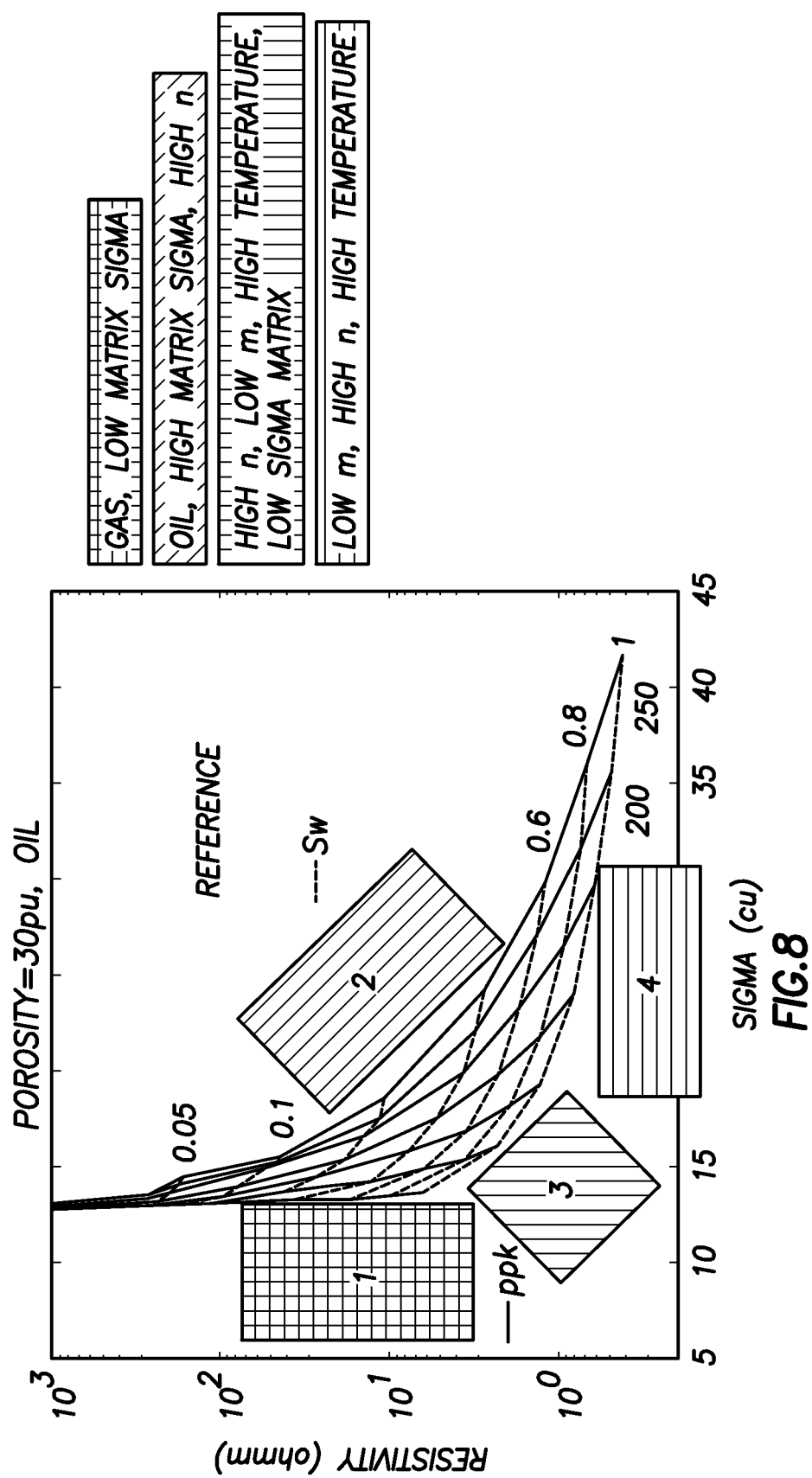
FIG. 8 is a crossplot showing how parameter sensitivity and selection can be investigated and performed, in accordance with one embodiment in the present disclosure.

The crossplots can be used to identify zones of changing properties. Having the ability to crossplot "on the fly" allows one to analyze a parameter's sensitivity and helps guide parameter selection for processing applications, as shown in FIG. 8. If a data point falls outside the "boomerang", depending on whether it falls in region 1, 2, 3, or 4 of the left panel, the parameter's remedial is shown in the right panel.

Figure 9:
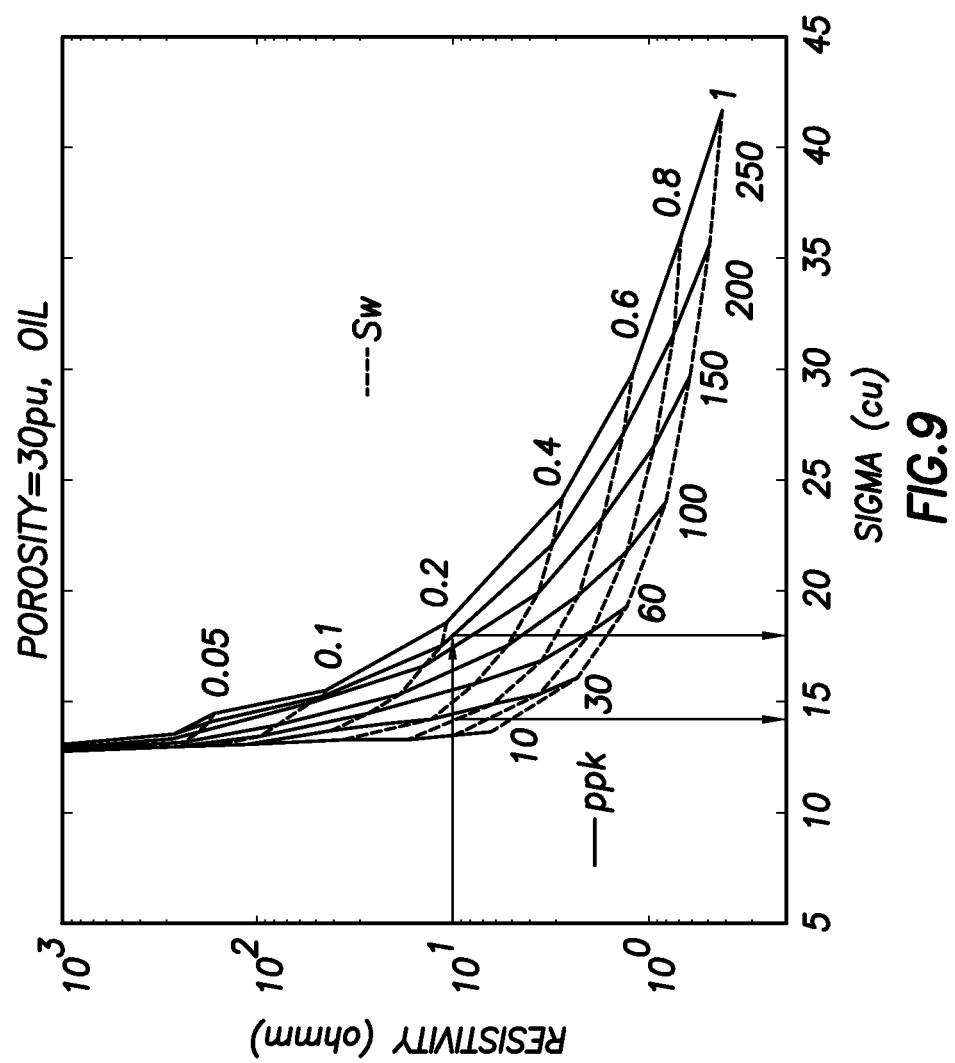
FIG. 9 is a crossplot showing how job planning may be performed, in accordance with one embodiment in the present disclosure.

A crossplot can also be used for job planning. One can enter a resistivity value and observe the dynamic range of the sigma value, as shown in FIG. 9. Since the sigma precision is about 0.5 cu (noise level), the crossplot shows that for a resistivity of 10 ohm-m, the technique can resolve a salinity range between 30 ppk and 200 ppk, but for a resistivity of 100 ohm-m, it cannot resolve the salinity. Thus, the crossplots can be used to validate (or invalidate) the application from input values of resistivity and Sigma.

Figure 12:
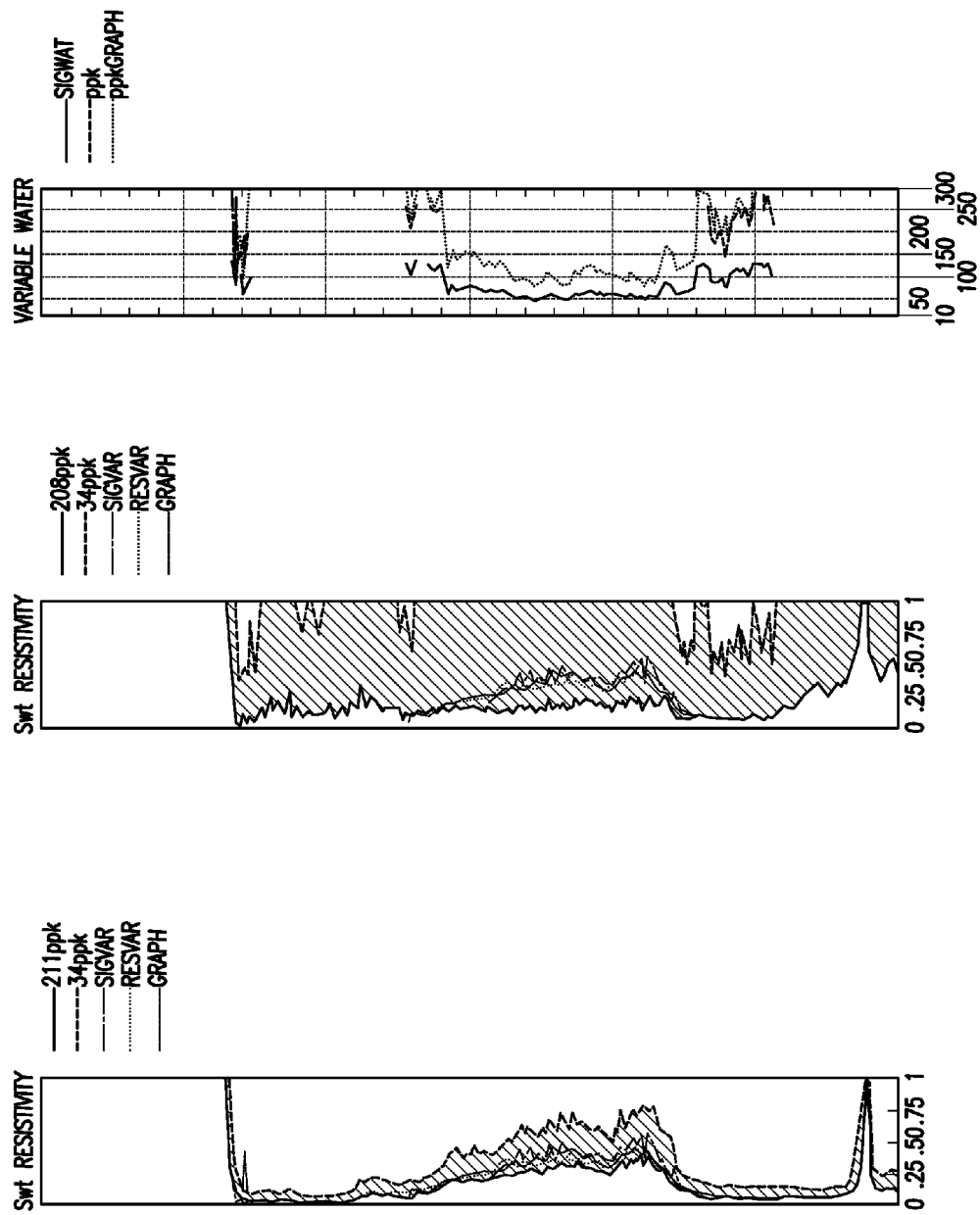
FIG. 12 is a set of various logs showing a comparison of a graphical solution versus a numerical solution, in accordance with one embodiment in the present disclosure.

The inverse solutions of water salinity and saturation can also be obtained by a purely graphical method, that is, by building a very dense grid of equi-salinity lines and equi-saturation lines, and interpolating between them to form a continuous surface of solution $S(R, \Sigma)$ that returns a pair of salinity-saturation values for an input pair of resistivity-sigma values. The graphical method is complementary to the numerical method that might be locked into a local minimum. FIG. 12 shows a comparison of graphical versus numerical solutions. The graphical technique gives an independent verification of the numerical solution.

Figure 13A:
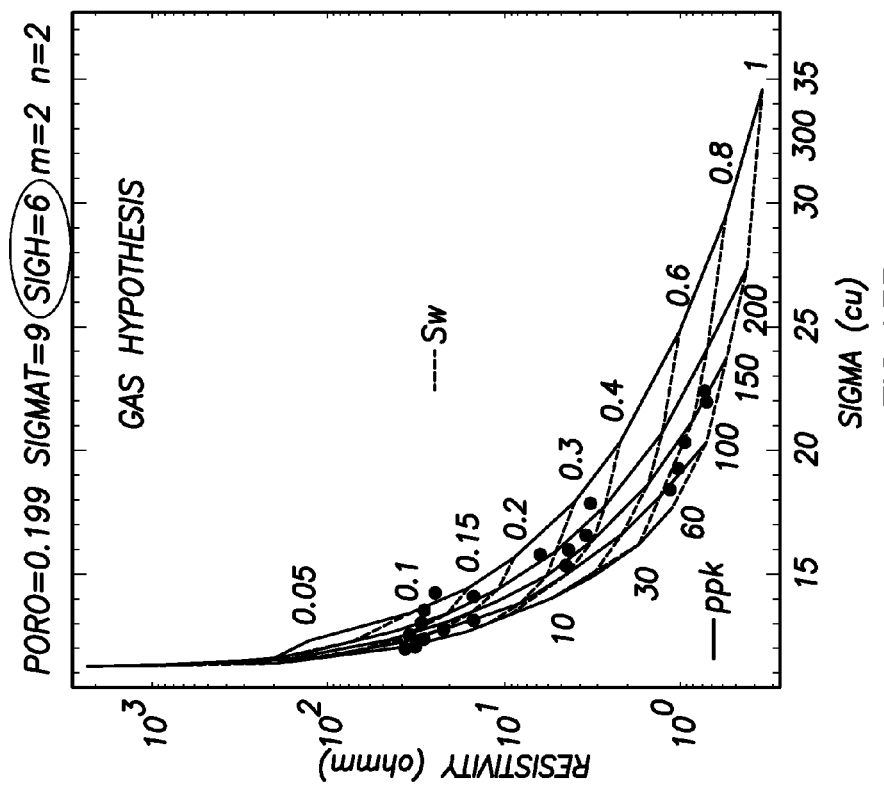
FIGS. 13A and 13B are crossplots showing how hydrocarbon typing may be performed, in accordance with one embodiment in the present disclosure.
Figure 13B:
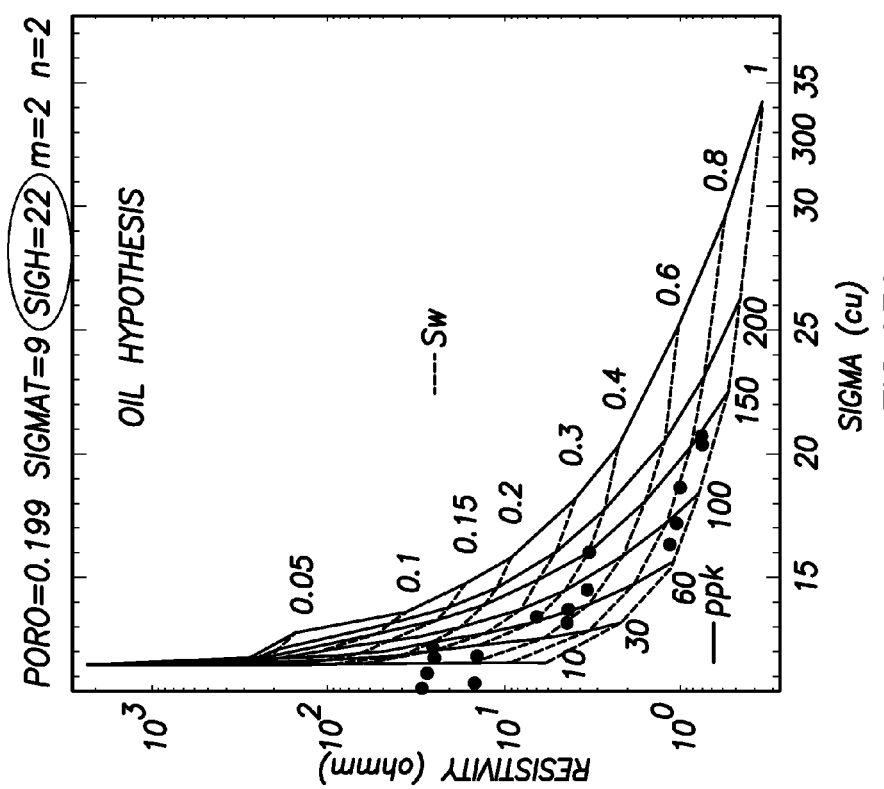

In another embodiment, one can use crossplots to distinguish oil from gas (i.e., perform hydrocarbon typing). FIG. 13A shows that the $S_w$-ppk overlay built with a hypothesis of oil does not cover the data with high resistivity. That indicates the hydrocarbon type is gas. The $S_w$-ppk overlay built with the hypothesis of gas covers all the data (FIG. 13B).

Figure 11:
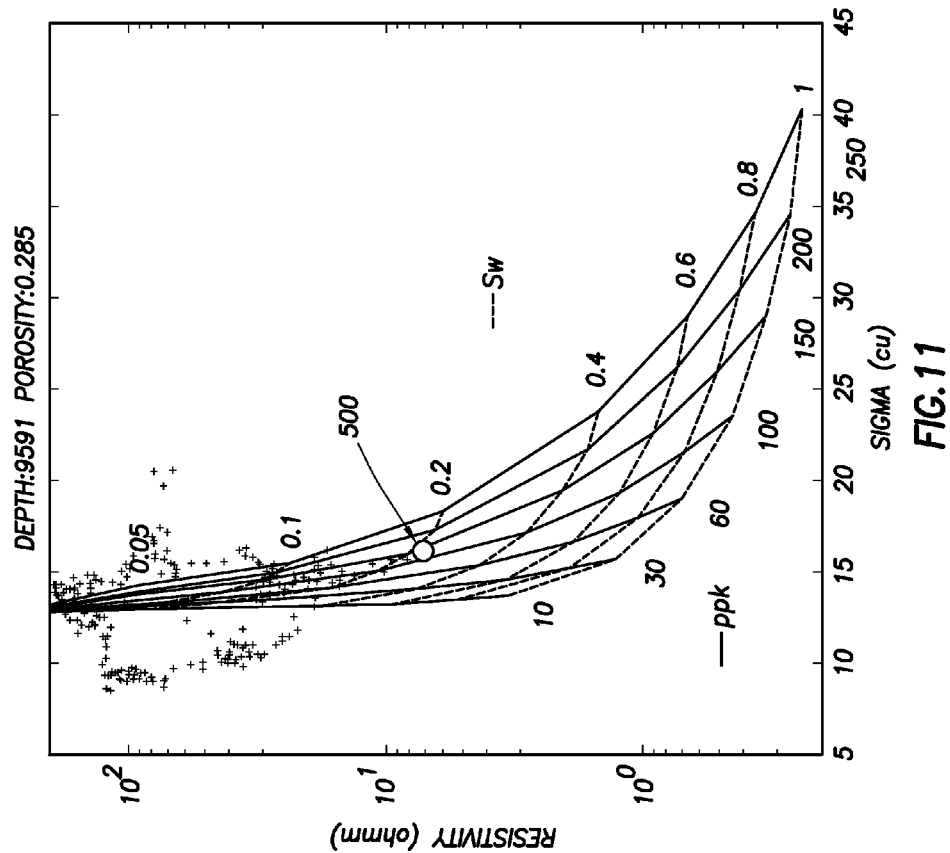
FIG. 11 is a real-time crossplot of resistivity and capture cross section showing the "current" data point, in accordance with one embodiment in the present disclosure.
Figure 10:
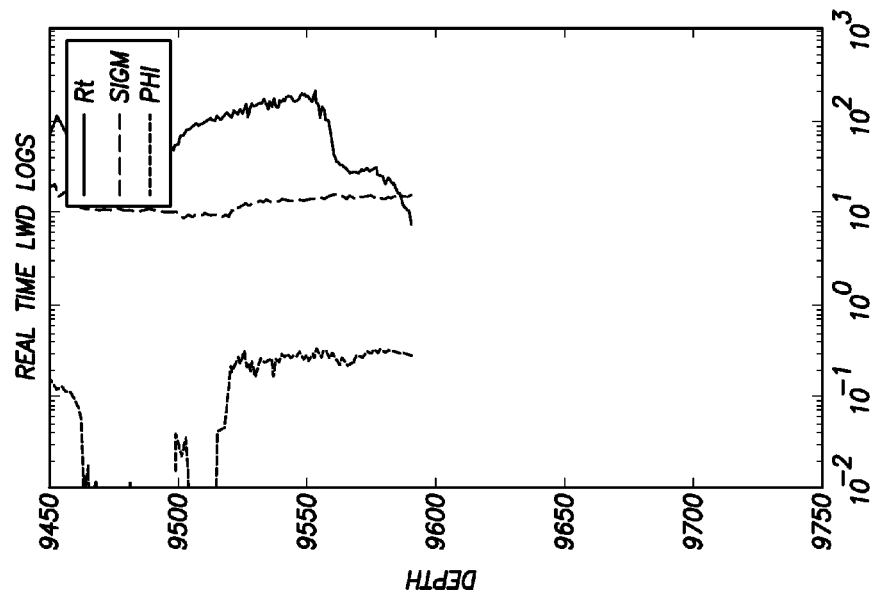
FIG. 10 shows the resistivity, the matrix capture cross section, and the porosity logs as a real-time answer product, in accordance with one embodiment in the present disclosure.

A real-time answer product can be captured and plotted at the surface as data is sent uphole using conventional or unconventional telemetry means including, but not limited to, mud pulse, acoustic, and wired drill pipe. Examples of such real-time answer products are shown in FIGS. 10 and 11. Those figures represent "snapshots" of the recorded data at a depth of 9,591 feet. FIG. 10 shows the resistivity, the matrix capture cross section, and the porosity logs. The "current" data point 500 is shown in the crossplot of FIG. 11. Instead of characterizing the well as penetrating a formation with a capture cross section of 17 cu and 7 ohm-m of resistivity, one can say the bottomhole assembly is in a hydrocarbon-bearing reservoir with about 25% water saturation and a salinity of 110,000 ppm.

While preferred embodiments have been described herein, those skilled in the art, having benefit of this disclosure, will appreciate that other embodiments are envisioned that do not depart from the inventive scope of the present application. Accordingly, the scope of the present claims or any subsequent related claims shall not be unduly limited by the description of the preferred embodiments herein.

What is claimed is:

1. A method to determine the salinity of connate water in a subsurface formation using a downhole logging tool or assembly, comprising:

providing a downhole logging tool or assembly having the ability to make substantially concurrent disparate measurements on the subsurface formation;

making substantially concurrent disparate measurements on the formation using the downhole logging tool or assembly;

defining a range of salinity values;

computing a water capture cross section value and a water resistivity value for each salinity value in the range of salinity values;

computing a first water saturation value using the computed water resistivity value, for each computed water resistivity value;

computing a second water saturation value using the computed water capture cross section value, for each computed water capture cross section value;

computing the square of the norm of the difference between the first water saturation value and the second water saturation value, for each pair of computed water saturation values corresponding to a salinity value; and selecting the salinity value that corresponds to the minimum computed squared norm as the determined salinity of the connate water.

2. The method of claim 1, wherein making disparate measurements includes making water resistivity measurements and water capture cross section measurements.

3. The method of claim 1, further comprising producing one or more crossplots of water resistivity versus water capture cross section.

4. The method of claim 3, wherein the one or more crossplots show lines of equi-saturation and lines of equi-salinity.

5. The method of claim 3, further comprising producing synthetic logs using the one or more crossplots.

6. The method of claim 3, further comprising identifying zones of changing properties using the one or more crossplots.

7. The method of claim 3, further comprising performing quality control using the one or more crossplots.

8. The method of claim 3, further comprising performing job planning using the one or more crossplots.

9. The method of claim 3, further comprising selecting parameters using the one or more crossplots.

10. The method of claim 3, further comprising analyzing the sensitivity of one or more parameters using the one or more crossplots.

11. The method of claim 3, further comprising performing hydrocarbon typing using the one or more crossplots.

12. The method of claim 1, further comprising producing crossplots of the square root of the conductivity versus the water capture cross section.

13. The method of claim 1, further comprising accounting for the presence of shale using shaly sand techniques.

14. A real-time logging system to determine the saturation and/or the salinity of connate water in a subsurface formation, comprising:
a downhole logging tool or assembly having the ability to make substantially concurrent disparate measurements on the connate water;
a telemetry system; and
a processor programmed to:
define a range of salinity values;
compute a water capture cross section value and a water resistivity value for each salinity value in the range of salinity values;
compute a first water saturation value using the computed water resistivity value, for each computed water resistivity value;
compute a second water saturation value using the computed water capture cross section value, for each computed water capture cross section value;
compute the square of the norm of the difference between the first water saturation value and the second water saturation value, for each pair of computed water saturation values corresponding to a salinity value; and
select the salinity value that corresponds to the minimum computed squared norm as the determined salinity of the connate water and/or select one of the water saturation values from the pair of computed water saturation values that produced the minimum computed squared norm.

15. The system of claim 14, wherein the telemetry system is one of mud pulse, acoustic, or wired drill pipe.

16. The system of claim 14, wherein all or part of the processor is located downhole.

* * * * *